United States Patent
Eaton et al.

(10) Patent No.: US 7,092,196 B2
(45) Date of Patent: Aug. 15, 2006

(54) CHARACTERISTIC MEASUREMENT OF AN ACTUATION DRIVE COIL AND ASSOCIATED DAMPING MECHANISM

(75) Inventors: James H. Eaton, Morgan Hill, CA (US); Darrell G. Follett, San Jose, CA (US); David H. Harper, San Jose, CA (US); Wayne I. Imaino, San Jose, CA (US); Leif S. Kirschenbaum, San Francisco, CA (US); Andrew J. McKee, San Jose, CA (US); Luis H. Palacios, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 10/876,197

(22) Filed: Jun. 23, 2004

(65) Prior Publication Data

US 2005/0285589 A1    Dec. 29, 2005

(51) Int. Cl.
G11B 5/02 (2006.01)
G11B 9/00 (2006.01)
G01B 7/00 (2006.01)
G11B 21/04 (2006.01)

(52) U.S. Cl. .................................. 360/75; 324/207.16
(58) Field of Classification Search .......... 324/207.16; 360/75
See application file for complete search history.

(56) References Cited

U.S. PATENT DOCUMENTS

| | | | |
|---|---|---|---|
| 5,805,372 A | 9/1998 | Hoogendoorn et al. | 360/77.01 |
| 5,841,274 A | 11/1998 | Masreliez et al. | 324/207.17 |
| 5,886,519 A | 3/1999 | Masreliez et al. | 324/207.17 |
| 5,949,619 A | 9/1999 | Eckberg et al. | 360/106 |
| 6,054,851 A | 4/2000 | Masreliez et al. | 324/207.17 |
| 6,101,453 A | 8/2000 | Suwa et al. | 702/56 |
| 6,188,535 B1 | 2/2001 | Lemke et al. | 360/70 |
| 6,196,047 B1 | 3/2001 | Carnegie et al. | 73/1.11 |
| 6,560,658 B1 | 5/2003 | Singer et al. | 710/5 |
| 2001/0052035 A1 | 12/2001 | Singer et al. | 710/5 |

*Primary Examiner*—Bot LeDynh
(74) *Attorney, Agent, or Firm*—Zilka-Kotab, PC

(57) ABSTRACT

A system and method for analyzing a coil actuator of a type having a coil and a magnet. A current source selectively applies a first current to a coil of a coil actuator for setting a moveable part of the coil actuator to a first position. A recording system captures data corresponding to a back electromotive force voltage produced by oscillation of the coil actuator upon movement of the moveable part of the coil actuator to a second position. A processor applies a curve fit to the back electromotive force data for calculating a frequency characteristic and damping response of the coil actuator.

23 Claims, 5 Drawing Sheets

CHARACTERISTIC MEASUREMENT OF AN ACTUATION DRIVE COIL AND ASSOCIATED DAMPING MECHANISM

FIELD OF THE INVENTION

The present invention relates to systems and methods for analyzing an actuation drive coil, and more particularly, this invention relates to electrical stimulation of an actuation drive coil and measure of the ensuing back electromotive force to measure the frequency characteristic and damping response of the actuation drive coil and associated damping mechanism.

BACKGROUND OF THE INVENTION

Actuation drive coils are used in a plethora of devices for precise mechanical positioning of parts. One area where actuation drive coils have found particular use is in magnetic storage drives. For example, actuation drive coils are used to align magnetic heads with data tracks on magnetic media. The recording and reading of data in tracks on magnetic storage media requires precise positioning of magnetic read/write heads. The read/write heads must be quickly moved to, and maintained centered over, particular data tracks as recording and reading of data takes place. The magnetic heads can record and read data as relative movement occurs between the heads and the magnetic storage media in a transducing direction. The heads are moved from track to track across the width of the tracks in a translating direction, which is perpendicular to the transducing direction.

For example, a recordable disk typically contains concentric data tracks and is rotated beneath a magnetic head. The direction of rotation defines the transducing direction. Radial movement from track to track defines the translating direction. A magnetic tape typically contains data tracks that extend along the length of the tape, parallel to the tape edges, in the transducing direction. In magnetic tape helical scan systems, however, the tape is moved beneath heads that are moved at an angle across the width of the tape, the diagonal direction defining the transducing direction.

Storage devices that read and record data on magnetic media typically use servo control systems to properly position the data heads in the translating direction. The servo control systems derive a position signal from a servo magnetic head that reads servo control information recorded in servo tracks on the storage media. In a timing based servo system timing information in the servo track allows the servo reader to precisely determine its' position in the servo track, and since the servo reader is a precise distance from the data writers and data readers in the recording head, locating the servo reader in the desired position in the servo track also locates the data readers and writers in their desired position.

To correctly position a tape head, for example, with respect to servo data, every tape head has an actuator to dynamically position the head in the tape drive. To explain this actuator, FIG. 1 is a simplified drawing of an actuator 100. This actuator 100 is an electromotive actuator which uses the current in coil 102 to interact with the magnetic field produced by permanent magnet 104 and produce a force on the coil. The actuator 100 also has a spring 106 which returns the head to its zero position. As shown in FIG. 2, to reduce the oscillation of the head back and forth upon changing position, damping 108 can be added to the actuator.

When building tape and hard disk drive systems that include coil actuators, it is not uncommon for one supplier to create the actuation coil, a different supplier creates the magnet, a third supplier creates the biasing spring, and yet a fourth party assembles all of the parts to create the coil actuation drive mechanism. However, because no one single party is responsible for quality control over manufacture of all of the parts, the physical characteristics of the parts may vary from lot to lot. The result is that the resonance frequency (and damping if present) may not always function within design tolerances. For instance, if the biasing strength of the spring changes, the resonance frequency will change. Similarly, if the damping gel or oil is thinner in one lot, more oscillation will be observed.

Thus, it is often necessary to measure the resonant frequency and damping characteristic of a tape had actuation drive coil in order to disposition or monitor the proper functioning of such drive coil. A quick, accurate, and inexpensive method is required for such measurements to make such measurement feasible in a manufacturing process.

One known solution is to drive the coil of the actuator with an external signal of known frequency and amplitude while simultaneously measuring the displacement amplitude response of the actuator. Several drawbacks to this technique include requiring a procedure to measure the drive amplitude and a procedure to measure the head displacement in a non-intrusive method. These methods are often costly, time intensive, and sometimes unreliable.

Therefore, a need exists for testing assembled coil actuation drives to ensure that they operate within design tolerances. A need also exists for a system and method for determining whether the quality of the parts used to create such coil actuation drives meets design parameters.

SUMMARY OF THE INVENTION

The present invention overcomes the drawbacks listed above by providing a system and method for analyzing a coil actuator of a type having a coil and a magnet, such as is typically found in a tape drive system for actuation of the tape head. A current source selectively steps the current from a first value to a second value, which moves the movable actuator coil from a first position to a second position. A recording system captures data corresponding to a back electromotive force voltage produced by oscillation of the coil actuator upon movement of the moveable part of the coil actuator to a second position. A processor applies a curve fit to the back electromotive force data for calculating a frequency characteristic of the coil actuator. Alternatively, a short duration current impulse could be applied and the back EMF monitored for calculating the frequency and damping characteristics of the actuator.

In one embodiment, the coil actuator also has a damping mechanism, e.g., gel, oil, pneumatic system, a fixed friction member, and combinations thereof. The processor can also determine a damping response of the coil actuator.

The second position of the moveable part of the coil actuator can be an "at rest" position, or the current source can apply a second current for moving the moveable part of the coil actuator to the second position.

For simplicity and ease of use, the system can be connected to existing electrical connections of the coil of the coil actuator.

The system can also include an amplifier for amplifying the voltage applied by the current source. As an option, a resistor can be positioned between the amplifier and the coil for reducing drainage of the back electromotive force signal back into the amplifier. The current source can include a digital to analog converter. The recording system can include an analog to digital converter.

The curve fit is performed using a curve fitting algorithm. Preferably, constants of the curve fitting algorithm are preselected for the particular coil actuator being analyzed.

To obtain several measurements, and to calculate an average of the frequency characteristic and damping response, the moveable part of the coil actuator can be cycled between the two positions sequentially and the frequency characteristic and damping response of the coil actuator determined for each cycle. To reduce processing time, the curve fit of an (N+1)th response can be initialized using coefficients found during a fit of an (N)th response.

The various components of the system can be embodied in a single unit, such as a personal computer (PC).

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

The present invention provides a system and method for electrical stimulation of a coil actuator and measurement of the ensuing back electromotive force (EMF) to measure the frequency characteristic and damping response of certain moveable parts of the actuator coil and any associated damping mechanisms. While such coil actuators are particularly useful for tape drives, the concepts described herein are extendible to measurement of any coil-magnet actuation system where the back-EMF may be measured.

Figure 1:
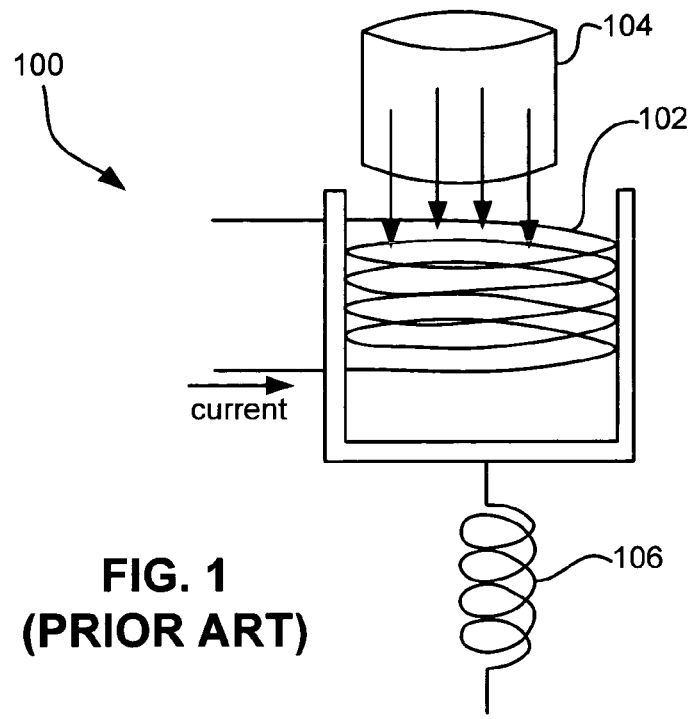
FIG. 1 is a simplified view of a coil actuator drive.
Figure 2:
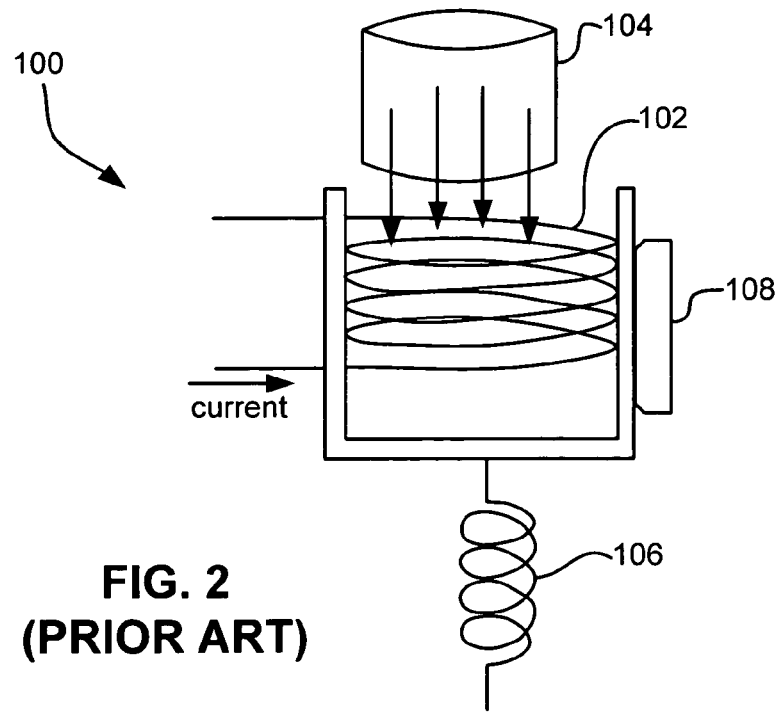
FIG. 2 is a simplified view of the coil actuator drive of FIG. 1 with damping.
Figure 3:
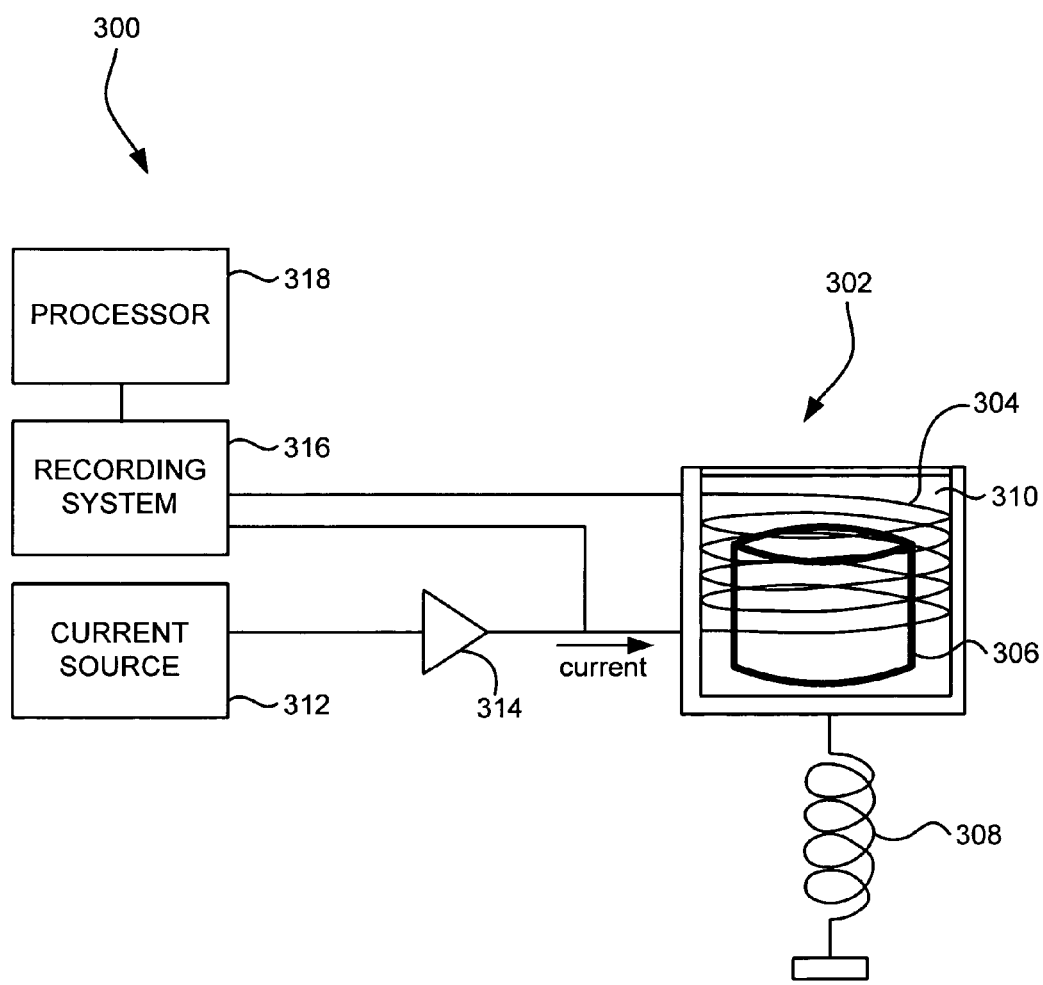
FIG. 3 is a system diagram of a system for analyzing a coil actuator according to one embodiment.

FIG. 3 illustrates a system 300 for analyzing a coil actuator 302. As shown, the coil actuator 302 includes a drive coil 304 formed of one or more windings of wire, the current in coil 304 interacting with the field produced by the permanent magnet to produce a force on the coil. The actuation drive coil 302 also has a spring 308 which biases the coil 304 towards an "at rest" position. To reduce the oscillation of the head back and forth upon changing position, an optional damping mechanism 310 can be added to the actuation drive coil. Suitable damping mechanisms include, without limitation, gel, viscous oil, a pneumatic system, a fixed friction member, etc.

Currents applied to the coil are produced by an electrical source 312. Illustrative electrical sources include a signal generator, a personal computer (PC) controlled Digital-to-Analog (DAC) converter, etc., which may nor may not be buffered by a buffer amplifier 314.

To measure the response of the actuator 302, the coil 304 is moved away from its starting position by energizing it. Then the voltage through the coil 304 is quickly changed or stopped. The spring will force the coil to a new position or back to its zero position, where the coil will oscillate about that position at the damped resonance frequency.

As the actuator oscillates, the coil moves back and forth through the magnetic field of the permanent magnet. By Faraday's law, the oscillation of the drive coil 304 in the presence of the fixed magnet results in an electromotively produced voltage appearing across the coil, the voltage being referred to as a back-EMF. The frequency of oscillation of this voltage is the damped resonance frequency of the actuator and the rate at which this voltage damps out is the damping rate of the oscillator. The back-EMF produced in the coil 304 by its oscillation with respect to the magnet 306 is quantified or digitized by means of a recording system 316 such as a digital oscilloscope or PC controlled Analog-to-Digital Converter (ADC). A processor 318 applies a curve fit to the back-EMF data using an appropriate algorithm. From the curve fit, the desired frequency characteristic and damping response can be obtained.

While the embodiment shown in FIG. 3 has a moveable coil 304, the system 300 would function in substantially the same manner if the coil 304 is fixed and the magnet 306 is moveable. One skilled in the art will also understand how such an actuator 302 would be implemented in various devices including tape and disk drives.

Figure 4:
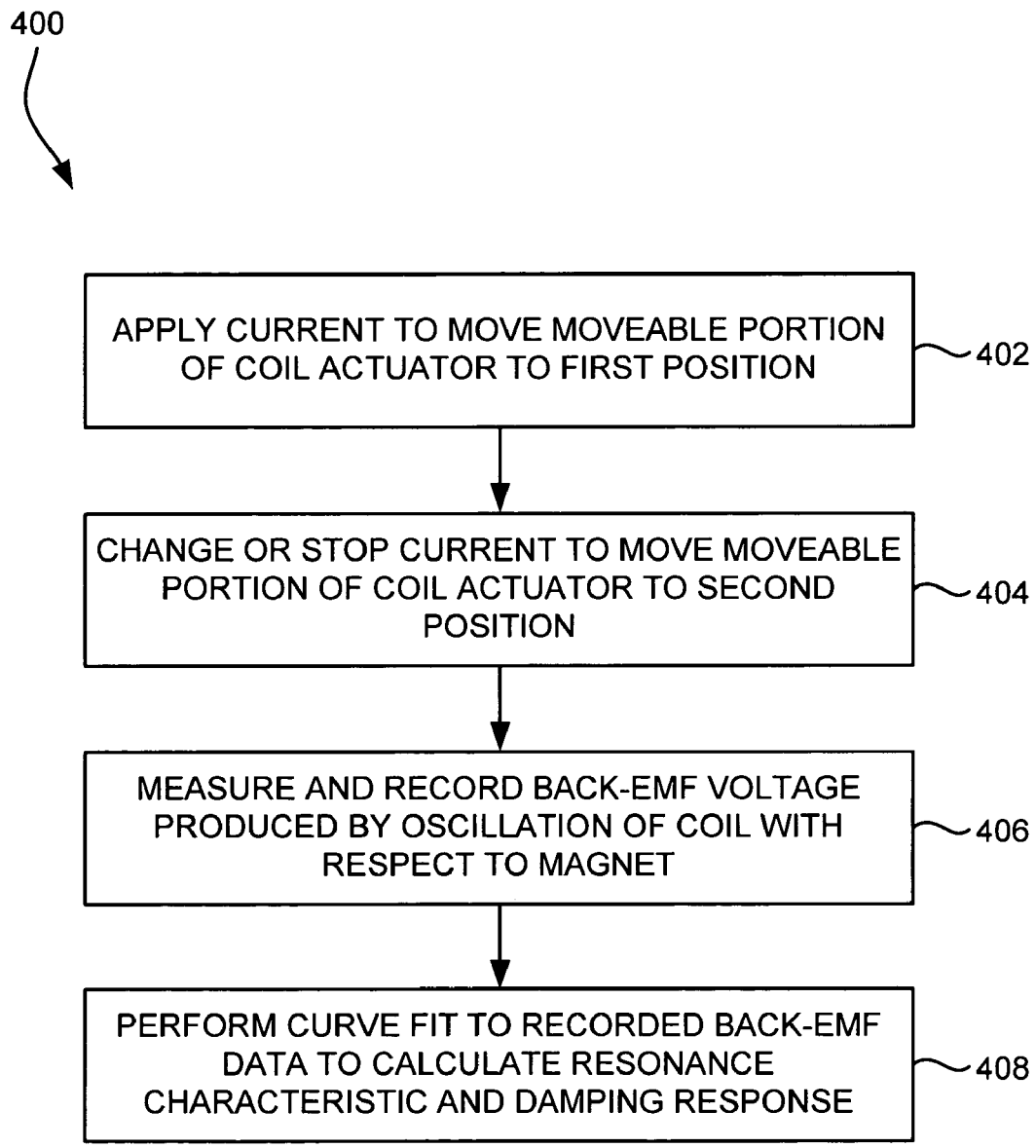
FIG. 4 is a flow diagram of a method for analyzing a coil actuator according to one embodiment.
Figure 5:
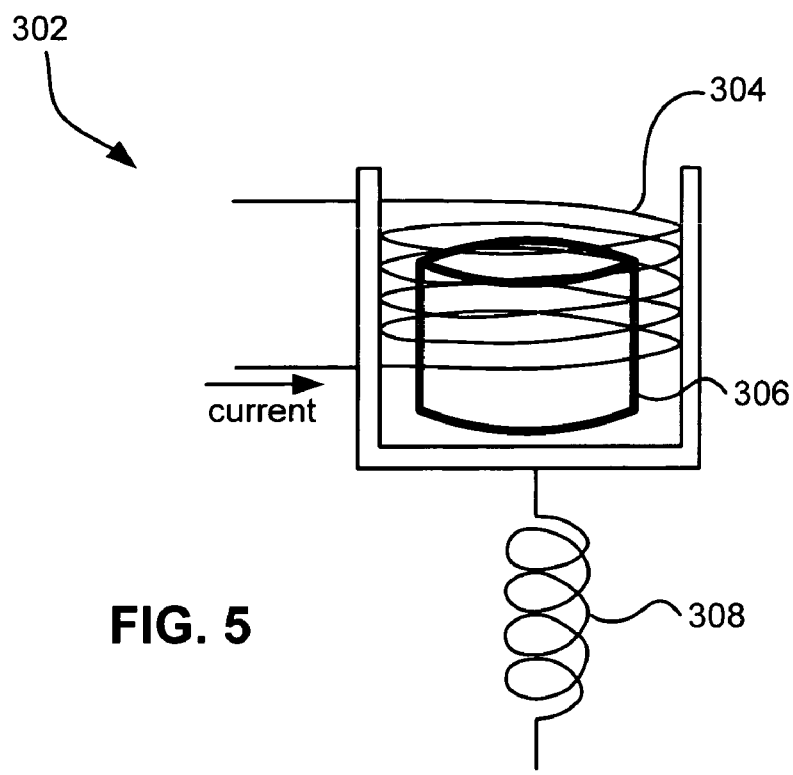
FIG. 5 is a system diagram showing the coil of a coil actuator in the displaced position with respect to the magnet.
Figure 6:
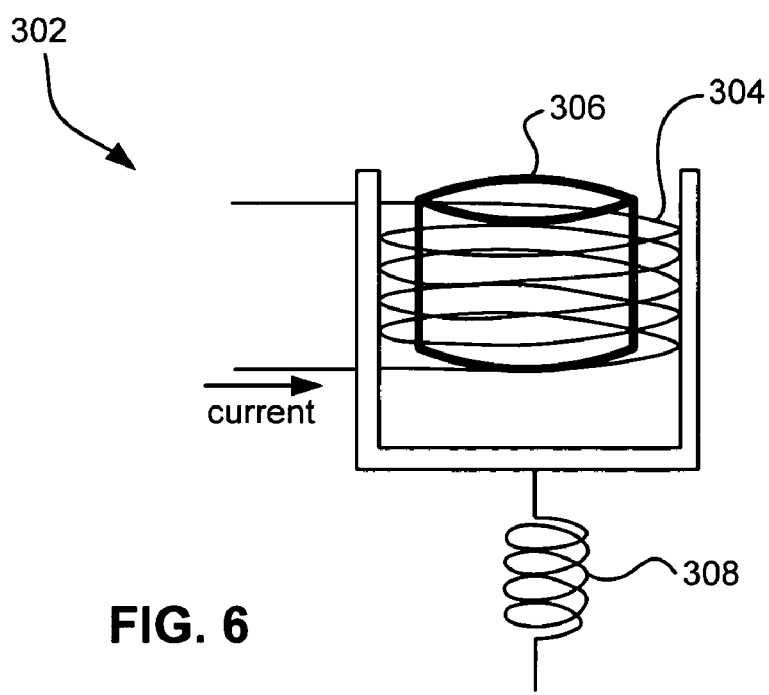
FIG. 6 is a system diagram showing the coil of a coil actuator in a second stable position with respect to the magnet.

FIG. 4 illustrates one method 400 of the present invention. In operation 402, the moveable portion of a coil actuator is stimulated to a large displacement by application of a fixed electrical current to the coil. Note FIG. 5, which shows the coil 304 in the displaced position with respect to the magnet 306. In operation 404 of FIG. 4, the current is then quickly changed to another value, such as zero or the opposite sign of the prior current, which corresponds to another stable position. Upon the change in current, the moving part of the coil actuator moves to the new position and undergoes decaying oscillation about the new stable position. Note FIG. 6, which shows the coil 304 in the new stable position. As mentioned above, the oscillation results in an electromotively produced voltage appearing across the coil. This voltage, measured in operation 406 (FIG. 4), is proportional to the velocity of the coil. The data represents a voltage-versus-time curve.

Figure 7:
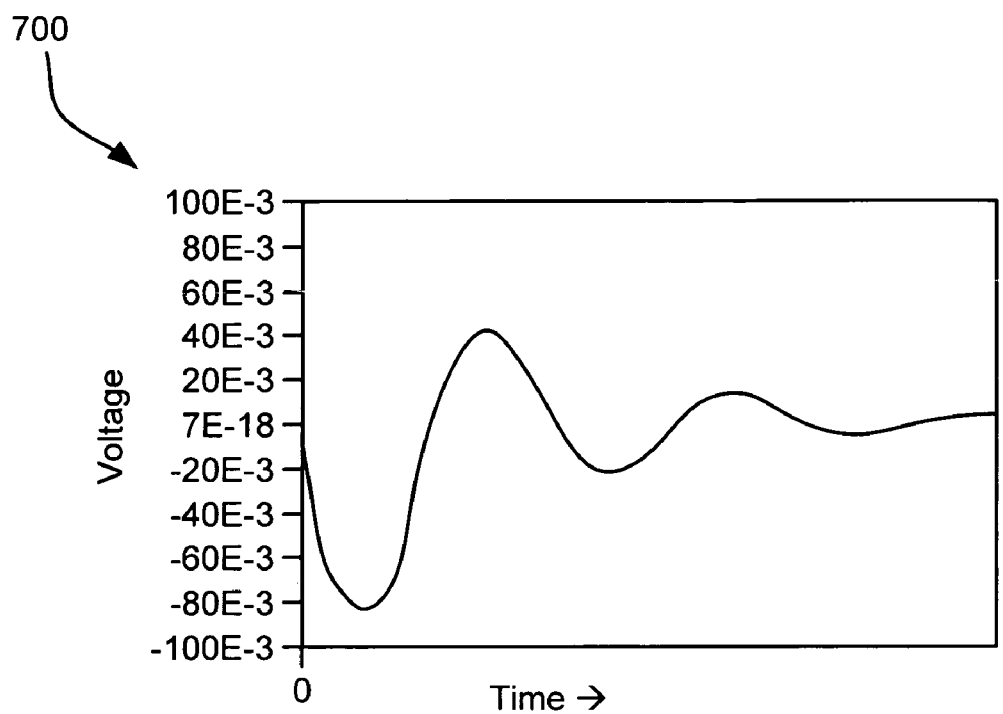
FIG. 7 illustrates an exemplary voltage-versus-time curve created by the decaying oscillation about the new stable position.

FIG. 7 illustrates an exemplary voltage-versus-time curve 700 created by the decaying oscillation about the new stable position. Note that a series of data points would represent a "curve" within the scope of the present invention.

In order to know that the quality of the springs and of the damping source is good and consistent, it is useful to measure the resonance frequency of the coil actuator and the amount of damping present. Although the resonance frequency changes when the mass attached to a spring is changed, the head and beam mass is almost exactly the same for every head built of a particular tape product, so measuring the resonance frequency tells one about the spring quality. Also, by measuring the damping constant, one can determine whether the quality of the damping substance or mechanism is straying. For instance, if resonant frequency starts to increase over time for later-produced coil actuators, the springs being implemented in the coil actuators are getting stiffer. If the decay time starts to decrease, the damping gel is getting thicker. If the decay time suddenly increases, the gel from a new lot is thinner than the gel from the previous lot.

With continued reference to FIG. 4, in operation 408, the voltage-versus-time curve is fitted with an appropriate formula to find the resonant frequency and damping exponentially decaying function and can usually be approximated by a second order damped linear system. When performing the curve fit to the data, the unknowns such as the amplitude, damped frequency, phase and decay time are found from the calculation. The resonant frequency (undamped resonance frequency) can then be calculated from the damped frequency. The resonant frequency and decay time are the main parameters of interest, as described below. The resonant frequency and decay time are the parameters that should be consistent from part to part.

An example of such a formula to be fit to the voltage-versus-time curve would be as follows:

$$V(t) = A * \cos(2\pi f_{damped} * t + \theta) * \exp(-t/\tau) + V_{offset} \qquad \text{Equation 1}$$

where:
V(t)=voltage as a function of time
A=amplitude
$f_{damped}$=damped resonance frequency
θ=phase
τ=decay time (also known as the inverse of the damping constant or damping rate)
$V_{offset}$=the voltage offset (the curve may not be centered around zero, i.e., there may be some offset)

and where the fit would produce values for the five coefficients in bold above (A, $f_{damped}$, θ, τ, Voffset).

The resonant frequency can then be calculated from the damped frequency. The resonant frequency (undamped resonance frequency) is related to the damped frequency ($f_{damped}$) and damping constant (1/τ) by the following formula:

$$f_{res} = \text{Resonant Frequency} = \sqrt{[f_{damped}]^2 + [1/\tau]^2} \qquad \text{Equation 2}$$

Testing can be conducted of every coil actuator. However, the sampling rate can vary per the desires of the manufacturer or tester, and may increase if quality is suspect. For instance, if damping gel lots are changed once a month, daily testing may be sufficient. If gels from many different lots are being used simultaneously, almost every part could be tested. In addition, the sampling rate can be reduced over time, as the reliability of the overall system becomes known.

Figure 8:
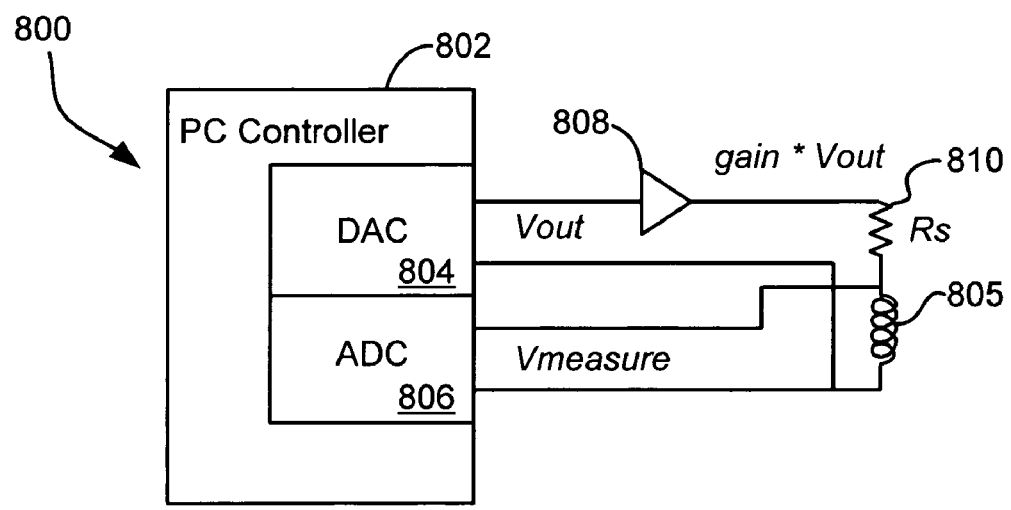
FIG. 8 is a system diagram of a system for analyzing a coil actuator according to one embodiment.

A preferred embodiment of the present invention is shown in FIG. 8. As shown, the system 800 includes a PC controller 802 having a DAC 804 for outputting a stimulation signal current (Iout) to the coil 805, and an ADC 806 for reading a resulting back-EMF voltage (Vmeasure). The stimulation signal Iout may be easily optimized in duration and magnitude to obtain the best signal-to-noise in the measured response Vmeasure. The Vmeasure signal is preferably conveyed to the ADC 806 with a shielded and/or coaxial line in order to avoid external noise.

An amplifier 808 amplifies Vout and sources a current Iout. Preferably, the buffer amplifier's gain is optimized to provide a range of drive current amenable to the actuation coil designs being measured given the range of outputs provided by the DAC.

If the amplifier is a voltage source, then a series resistor (Rs) 810 can be placed in series with the coil 805 to isolate the amplifier 808 from the coil 805. Because the EMF produced current across the coil 805 is small, Rs is used to prevent drainage of current back into the current amplifier 808. Note that Rs can be 0 (no resistor). Optimally, Rs is sized to optimize the back-EMF signal measured by the ADC. Preferably, a current source is utilized which removes any requirement for the resistor Rs.

The response formula is preferably fitted to the response Vmeasure using a Levenberg-Marquardt curve fitting algorithm. The fitting algorithm's input constants are optimized for fast and accurate convergence on a particular actuation system's expected response, which reduces computation time, i.e., coil design 1 has some set of initial fit coefficients a1, b2, c1, d1, e1, whereas coil design 2 has some set of initial coefficients a2, b2, c2, d2, e2.

Many impulses are applied to the coil and many responses measured. Each response is fitted and the fit coefficients from all the responses are averaged to find a best measure of the coil response. The fit of the (N+1)th response is initialized using the coefficients found by fitting the (N)th response, which greatly reduces curve fitting computation time. i.e. the (N)th curve fit generated coefficients a1 [N],b1 [N],c1 [N],d1 [N],e1 [N], which are then used as guesses to fit the (N+1)t The repetition rate of the stimulus current Iout is optimized to minimize measurement time for N responses while avoiding contaminating one response (N+1) with residual ringing from the prior response (N). In other words, enough time is allowed to elapse between Iout pulses to allow the coil (or magnet) to achieve a substantially stationary state before it is stimulated again. The response waveform capture time of Vmeasure is optimized to minimize the amount of data collected while still collecting enough to ensure accurate characterization of the response.

This embodiment has the following advantages:
The measurement system has a small size.
One computer can be utilized to furnish the excitation pulse, acquire the resultant signal, and analyze the signal.
Minimal requirements for components in addition to the computer which acquires and analyzes data.
The measurement system is applied to a coil actuation system where no special fixturing is required nor where special access to the coil actuation system, e.g., by partial disassembly, is required. In other words, there is no need to take the system apart for testing. Rather, wires exiting the housing of the coil actuation system can be used.
There are many parameters (e.g., voltage, pulse time of Vout, etc.) which may be optimized to minimize measurement time while also optimizing accuracy of measurement.

There has thus been described a measurement technique which does not require an external measurement apparatus to interact with the coil actuation system (such as a capacitance proximity probe, a laser position measurement probe, etc.). The measurement technique does not require fixturing to hold, position, or manipulate the coil actuation system, such as are required for some implementations of the probes mentioned above, which must be positioned precisely. A mechanical mechanism to move the magnet to its starting position requires precision in order to be repeatable, and also makes it harder to change testing parameters. In the present system, everything is done electrically, so it is highly repeatable and testing parameters can be changed by merely changing the stimulation signal voltage.

The measurement technique only requires electrical connection to the existing coil electrical connection. The measurement technique is capable of measuring the damping response directly. The measurement technique can utilize a single impulse to the coil actuation system to measure its response as opposed to stimulus over a wide frequency range. The measurement technique is fast in comparison to pre-existing techniques. The measurement technique allows optimization of the coil stimulus in duration and magnitude to obtain an optimal measure of the actuation system's frequency and damping (a different measurement technique which mechanically drives the actuation system may not be so easily optimized).

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system for analyzing a coil actuator of a type having a coil and a magnet, the system comprising:
   a current source for selectively applying a first current to a coil of a coil actuator for moving a moveable part of the coil actuator to a first position;
   a recording system for recording data corresponding to a back electromotive force voltage produced by oscillation of the coil actuator upon movement of the moveable part of the coil actuator to a second position; and
   a processor for applying a curve fit to the back electromotive force data for calculating a frequency characteristic of the coil actuator.

2. The system as recited in claim 1, wherein the coil actuator also has a damping mechanism, wherein the processor also determines a damping response of the coil actuator.

3. The system as recited in claim 2, wherein the damping mechanism is selected from a group consisting of gel, oil, pneumatic system, a fixed friction member, and combinations thereof.

4. The system as recited in claim 1, wherein the current source applies a second current for moving the moveable part of the coil actuator to the second position.

5. The system as recited in claim 1, wherein the system is connected to existing electrical connections of the coil of the coil actuator.

6. The system as recited in claim 1, further comprising an amplifier for amplifying the current or voltage applied by the current or voltage source.

7. The system as recited in claim 6, further comprising a resistor positioned between the amplifier and the coil for reducing drainage of the back electromotive force signal back into the amplifier.

8. The system as recited in claim 1 wherein the current applied constitutes an impulse applied to the coil producing an impulse response by the coil actuator.

9. The system as recited in claim 1, wherein the current source includes a digital to analog converter.

10. The system as recited in claim 1, wherein the recording system includes an analog to digital converter.

11. The system as recited in claim 1, wherein the curve fit is performed using a curve fitting algorithm, wherein constants of the curve fitting algorithm are preselected for the particular coil actuator being analyzed.

12. The system as recited in claim 1, wherein the moveable part of the coil actuator is cycled between the first and second positions sequentially and the frequency characteristic of the coil actuator is determined for each cycle.

13. The system as recited in claim 12, wherein the curve fit is performed using a curve fitting algorithm, wherein the curve fit of an (N+1)th response is initialized using coefficients found during a fit of an (N)th response.

14. The system as recited in claim 1, wherein the current source, recording system, and processor are embodied in a personal computer (PC).

15. The system as recited in claim 1, wherein the coil actuator is designed for actuation of a tape head.

16. A system for analyzing a coil actuator of a type having a coil, a magnet, and a damping mechanism, the system comprising:
   a current source for selectively applying a first voltage to a coil of a coil actuator for moving a moveable part of the coil actuator to a first position;
   a recording system for recording data corresponding to a back electromotive force voltage produced by oscillation of the coil actuator upon movement of the moveable part of the coil actuator to a second position; and
   a processor for applying a curve fit to the back electromotive force data for calculating a frequency characteristic and damping response of the coil actuator.

17. The system as recited in claim 16, wherein the damping mechanism is selected from a group consisting of gel, oil, pneumatic system, a fixed friction member, and combinations thereof.

18. The system as recited in claim 16, wherein the system is connected to existing electrical connections of the coil of the coil actuator.

19. The system as recited in claim 16, wherein the curve fit is performed using a curve fitting algorithm, wherein constants of the curve fitting algorithm are preselected for the particular coil actuator being analyzed.

20. The system as recited in claim 16, wherein the moveable part of the coil actuator is cycled between the first and second positions sequentially and the frequency characteristic of the coil actuator is determined for each cycle, wherein the curve fit is performed using a curve fitting algorithm, wherein the curve fit of an (N+1)th response is initialized using coefficients found during a fit of an (N)th response.

21. The system as recited in claim 16, wherein the current source, recording system, and processor are embodied in a personal computer (PC).

22. The system as recited in claim 16, wherein the coil actuator is designed for actuation of a tape head.

23. A method for analyzing a coil actuator of a type having a coil and a magnet, the method comprising:
   selectively applying a first voltage to a coil of a coil actuator for setting a moveable part of the coil actuator to a first position;
   recording data corresponding to a back electromotive force voltage produced by oscillation of the coil actuator upon movement of the moveable part of the coil actuator to a second position; and
   applying a curve fit to the back electromotive force data for calculating a frequency characteristic of the coil actuator.

* * * * *